US010885354B2

(12) United States Patent
Maeda et al.

(10) Patent No.: US 10,885,354 B2
(45) Date of Patent: Jan. 5, 2021

(54) PERIMETER MONITORING DEVICE AND PERIMETER MONITORING METHOD

(71) Applicant: DENSO CORPORATION, Kariya (JP)

(72) Inventors: Yu Maeda, Nisshin (JP); Taketo Harada, Nisshin (JP); Mitsuyasu Matsuura, Nisshin (JP); Hirohiko Yanagawa, Kariya (JP)

(73) Assignee: DENSO CORPORATION, Kariya (JP)

(*) Notice: Subject to any disclaimer, the term of this patent is extended or adjusted under 35 U.S.C. 154(b) by 55 days.

(21) Appl. No.: 16/328,465

(22) PCT Filed: Aug. 3, 2017

(86) PCT No.: PCT/JP2017/028265
§ 371 (c)(1),
(2) Date: Feb. 26, 2019

(87) PCT Pub. No.: WO2018/043028
PCT Pub. Date: Mar. 8, 2018

(65) Prior Publication Data
US 2020/0210722 A1 Jul. 2, 2020

(30) Foreign Application Priority Data
Aug. 29, 2016 (JP) ................. 2016-167182

(51) Int. Cl.
G01B 11/02 (2006.01)
G01B 11/03 (2006.01)
(Continued)

(52) U.S. Cl.
CPC ........ G06K 9/00805 (2013.01); G01B 11/026 (2013.01); G06K 9/2054 (2013.01); G06K 9/3233 (2013.01)

(58) Field of Classification Search
USPC ................ 382/103–108, 122, 123, 154–181, 382/214–228, 254–312
See application file for complete search history.

(56) References Cited

U.S. PATENT DOCUMENTS

2005/0231341 A1 10/2005 Shimizu
2006/0125679 A1* 6/2006 Horibe .................. G01S 13/867
342/52

(Continued)

FOREIGN PATENT DOCUMENTS

JP 2003-194938 A 7/2003
JP 2005-318541 A 11/2005
(Continued)

Primary Examiner — Marcellus J Augustin
(74) Attorney, Agent, or Firm — Maschoff Brennan

(57) ABSTRACT

A perimeter monitoring device is applied to a vehicle comprising a distance measuring sensor for transmitting a probing wave and receiving a reflected wave of the probing wave and an imaging device for capturing an image of the surroundings of the vehicle. The perimeter monitoring device comprises: an information acquisition unit for acquiring distance information, directional information, and object width information of an object existing in the vicinity of the vehicle as detection information of the object provided by the distance measuring sensor; an area setting unit for setting an image processing area on which image processing is performed in the image captured by the imaging device based on the distance information, the directional information, and the object width information acquired by the information acquisition unit; and an object recognition unit for performing the image processing on the image processing area set by the area setting unit to recognize the object.

5 Claims, 4 Drawing Sheets

(51) Int. Cl.
*G06K 9/20* (2006.01)
*G06K 9/00* (2006.01)
*G06K 9/32* (2006.01)

(56) References Cited

U.S. PATENT DOCUMENTS

| | | | | |
|---|---|---|---|---|
| 2008/0232198 A1* | 9/2008 | Hayasaka | ............ | G01S 15/931 367/99 |
| 2010/0274446 A1* | 10/2010 | Sasajima | ................ | G08G 1/165 701/36 |
| 2011/0037853 A1 | 2/2011 | Shiraishi | | |
| 2013/0335569 A1 | 12/2013 | Einecke et al. | | |
| 2016/0116585 A1* | 4/2016 | Fukuman | ............ | G01S 15/931 367/99 |

FOREIGN PATENT DOCUMENTS

| | | |
|---|---|---|
| JP | 2006-151125 A | 6/2006 |
| JP | 2010-008280 A | 1/2010 |
| JP | 2012-164275 A | 8/2012 |
| JP | 2013-190421 A | 9/2013 |
| WO | 2013/024509 A1 | 2/2013 |

* cited by examiner

PERIMETER MONITORING DEVICE AND PERIMETER MONITORING METHOD

CROSS REFERENCE TO RELATED APPLICATION

This application is the U.S. national phase of International Application No. PCT/JP2017/028265 filed Aug. 3, 2017 which designated the U.S. and claims priority to Japanese Patent Application No. 2016-167182 filed Aug. 29, 2016, the contents of which are incorporated herein by reference.

TECHNICAL FIELD

The present disclosure is related to a perimeter monitoring device and a perimeter monitoring method, and in particular, to a perimeter monitoring device and a perimeter monitoring method applied to a vehicle including a distance measuring sensor and an imaging device.

BACKGROUND ART

Conventionally, a vehicle perimeter monitoring system is known that uses an imaging device and a distance measuring sensor to detect an object existing near the vehicle, to display it on an in-vehicle display device, and/or to issue a warning to avoid contact with the object (see, for example, PTL 1), PTL 1 discloses setting, in a viewpoint converted image obtained by converting the viewpoint of an image captured by an imaging device, the range between the position determined based on the detected distance of the obstacle detected by an ultrasonic sonar, and the detection completed position calculated based on the height of the imaging device and the provisional height of the obstacle as the image processing area, and performing image processing on the image processing area to acquire the height of the obstacle.

CITATION LIST

Patent Literature

SUMMARY OF THE INVENTION

There is a concern that, when performing image processing on a part of the image for object recognition, if the image processing area is too large, it takes too much time to process the image, and the temporal lag between the actual environment surrounding the vehicle and the information provided to the driver for warning may become large. On the other hand, if the size of the image processing area is too small, there is a concern that the object is not sufficiently included in the set image processing area, and the recognition accuracy of the object may deteriorate.

The present disclosure has been devised in view of the above problems, and an object thereof is to provide a perimeter monitoring device and a perimeter monitoring method capable of accurately recognizing information of an object existing near a vehicle as quickly as possible.

In order to solve the above problems, the present disclosure adopts the following means.

The present invention relates to a perimeter monitoring device applied to a vehicle comprising a distance measuring sensor for transmitting a probing wave and receiving a reflected wave of the probing wave and an imaging device for capturing an image of the surroundings of the vehicle. A perimeter monitoring device according to an aspect of the present disclosure includes an information acquisition unit for acquiring distance information, directional information, and object width information of an object existing in the vicinity of the vehicle as detection information of the object provided by the distance measuring sensor; an area setting unit for setting an image processing area on which image processing is performed in the image captured by the imaging device based on the distance information, the directional information, and the object width information acquired by the information acquisition unit; and an object recognition unit for performing the image processing on the image processing area set by the area setting unit to recognize the object. The information acquisition unit acquires the object width information based on reflection surface information of the object detected by the distance measuring sensor, and the area setting unit sets the image processing area using the object width information acquired based on the reflection surface information.

In the above configuration, an image processing area is set in the image captured by the imaging device based on the detection information of the object provided by the distance measuring sensor. At this time, the detection information of the object used to set the image processing area includes not only the distance information but also the directional information and the object width information of the object. Thus, it is possible to set an image processing area having a size corresponding to the object width of each object over an area corresponding to the position where the object exists. In this case, when object recognition is performed by image processing, the part corresponding to the object in the image is subject to the image processing, and thus it is possible to reduce unnecessary image processing on the parts where no object exists and therefore the processing load can be reduced. Therefore, according to the above configuration, it is possible to recognize the information on an object existing near the vehicle with high accuracy and as soon as possible.

BRIEF DESCRIPTION OF THE DRAWINGS

The above and other objects, features, and advantages of the present disclosure will become clearer from the following detailed description with reference to the accompanying drawings. In the drawings.

DESCRIPTION OF THE EMBODIMENTS

Figure 1:
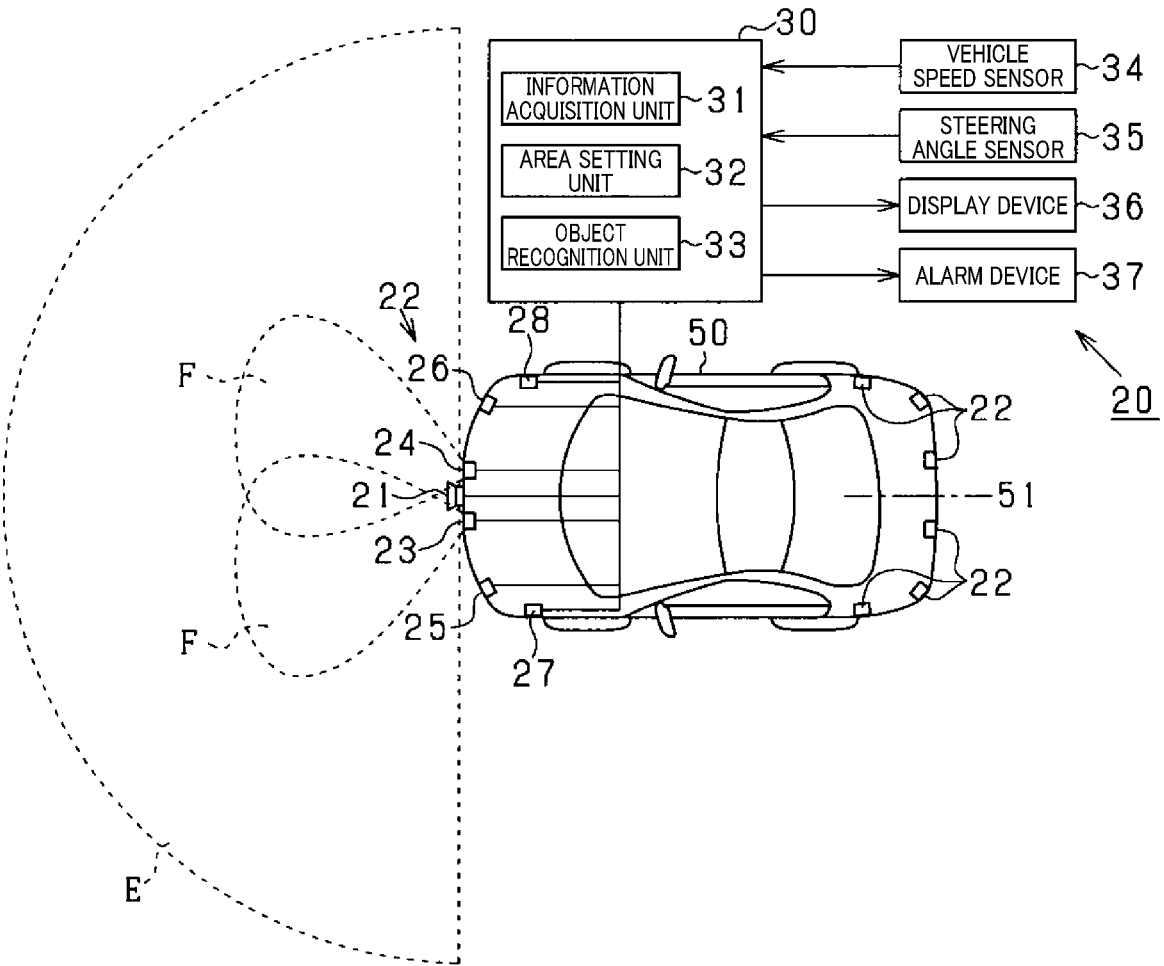
FIG. 1 is a diagram showing the general configuration of a vehicle perimeter monitoring system.

Embodiments will be described below with reference to the drawings. The same or equivalent parts in the embodiments described below are assigned with the same reference number in the drawings, and an earlier explanation should be referred to regarding those parts having the same reference number as another.

First, a vehicle perimeter monitoring system 20 of the present embodiment will be described with reference to FIG. 1. The vehicle perimeter monitoring system 20 of this embodiment is mounted on a vehicle (hereinafter referred to as the "host vehicle 50"), and as shown in FIG. 1, includes an in-vehicle camera 21 as an imaging device, an ultrasonic sensor 22 as a distance measuring sensor, and a monitoring ECU 30 as a perimeter monitoring device.

The in-vehicle camera 21 comprises, for example, a monocular camera or a stereo camera, such as a CCD camera, a CMOS image sensor, a near infrared camera. The in-vehicle camera 21 is attached to a front part of the host vehicle 50 at the center in the vehicle width direction and at a certain height (for example, above the front bumper), and captures an image of an area spreading at a predetermined angle ahead of the vehicle.

The ultrasonic sensor 22 is a sensor that detects the distance to an obstacle existing near the host vehicle 50. In the present embodiment, a plurality of sensors are attached to the front and rear bumpers of the host vehicle 50 such that they arranged in the vehicle width direction with certain gaps between each other. For example, the ultrasonic sensor 22 provided on the front bumper include two center sensors 23, 24 attached near the center line 51 of the vehicle width and symmetrically about the center line 51, two corner sensors 25, 26 attached to the left corner and the right corner of the vehicle 50, and lateral sensors 27, 28 attached to the left side and the right side of the vehicle 50.

FIG. 1 shows an imaging area E of the in-vehicle camera 21 and a detection area F of the ultrasonic sensor 22. In FIG. 1, for the sake of convenience, only the detection areas of the center sensors 23 and 24 are shown for the ultrasonic sensor 22. In the present embodiment, the detection distance of each ultrasonic sensor 22 is shorter than the imaging distance of the in-vehicle camera 21 (for example, several tens of centimeters to 1 or 2 meters).

Various sensors such as a vehicle speed sensor 34 for detecting the vehicle speed and a steering angle sensor 35 for detecting the steering angle are provided in the host vehicle 50 in addition to the in-vehicle camera 21 and the ultrasonic sensor 22.

The monitoring ECU 30 is a computer having a CPU, a ROM, a RAM, an I/O and the like. The CPU executes programs installed in the ROM so as to implement functions for supporting driving of the host vehicle 50 based on the object detection results of the in-vehicle camera 21 and the ultrasonic sensor 22. Specifically, the monitoring ECU 30 displays the surroundings of the vehicle 50 on the in-vehicle display device 36, and/or when the vehicle 50 may contact an object existing in the vicinity of the vehicle 50, it activates the alarm device 37 to warn the driver. Alternatively, it may output the recognized object detection information to the driving support device, and the driving support device may execute various controls such as braking control and steering control for avoiding contact with the object.

When displaying an image on the display device 36, the monitoring ECU 30 executes a control for converting the captured image captured by the in-vehicle camera 21 into a bird's-eye image as viewed from a virtual viewpoint set above the host vehicle 50 towards the road surface, and displaying it on the display device 36. The display device 36 is provided at a position (e.g., an instrument panel) visible to the driver. The captured image may be displayed on the display device 36.

Next, object detection by the ultrasonic sensor 22 will be described. The monitoring ECU 30 outputs a control signal to the ultrasonic sensor 22 and instructs the ultrasonic sensor 22 to transmit ultrasonic waves at a predetermined transmission cycle (for example, at intervals of several hundred milliseconds). In addition, the distance to the object is calculated based on the reflected wave time which is the time from the transmission to the reception of a wave by the ultrasonic sensor 22.

Specifically, the ultrasonic sensor 22 receives the reflected wave of the probing wave transmitted by itself as a direct wave, and acquires the reflected wave time as the distance information. In addition, the reflected wave of a probe waving transmitted by a sensor different from the sensor that transmitted the probing wave is received as an indirect wave, and the reflected wave time is acquired as the distance information. The monitoring ECU 30 uses the principle of triangulation with the distance information acquired from the direct wave and the distance information acquired from the indirect wave to calculate coordinates (x,y) representing the relative position of the object with respect to the host vehicle 50 as the directional information of the object existing in the vicinity of the host vehicle 50.

Figure 2:
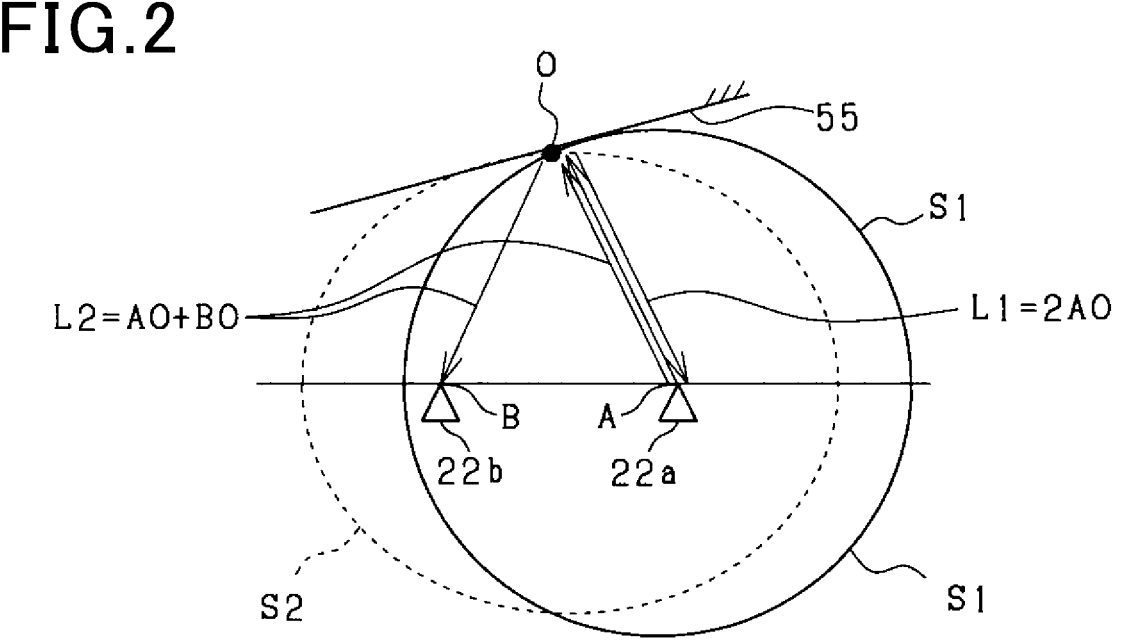
FIG. 2 is a diagram for explaining the way of acquiring the directional information of an object.

The method of calculating the directional information of the object 40 will be described with reference to FIG. 2. In FIG. 2, the first sensor 22a and the second sensor 22b, which are two adjacent ultrasonic sensors 22, and the object 55 existing in front of the host vehicle 50 are shown in a plan view. In FIG. 2, the first sensor 22a is a direct detection sensor that transmits a probing wave and receives a direct wave, and the second sensor 22b is an indirect detection sensor that receives a reflected wave (indirect wave) of an ultrasonic wave transmitted by another sensor. The direct detection sensor and the indirect detection sensor are two sensors performing triangulation (the same applies to FIG. 4).

In FIG. 2, based on the direct wave received by the first sensor 22a, the roundtrip distance (2AO) between the position A of the first sensor 22a and the reflection point O of the object 55 is calculated as L1. In addition, based on the indirect wave received by the second sensor 22b, the distance (AO+OB) of the position A, the reflection point O, and the position B of the second sensor 22b is calculated as L2. As shown in FIG. 2, according to the direct wave, it can be grasped that the object 55 exists on the circle S1 centered on the position A and having the line segment AO as the radius, and according to the indirect wave, it can be grasped that the object 55 exists on the ellipse S2 on which AO+OB is constant. In this case, it can be recognized that the reflection point O of the object 55 is at the intersection of the circle S1 and the ellipse S2. Therefore, by obtaining the coordinates (x,y) of the reflection point O, the relative position of the object 55 can be calculated.

Next, a process of recognizing an object existing near the host vehicle 50 using an image captured by the in-vehicle camera 21 will be described in detail. In the present embodiment, the monitoring ECU 30 performs image processing on the area of the image captured by the in-vehicle camera 21 that matches with the object detection information provided by the ultrasonic sensor 22, and thereby obtains detailed information on the object (for example, the type of the object, the height information of the object, etc.) as the object recognition process.

Specifically, as shown in FIG. 1, the monitoring ECU 30 comprises an information acquisition unit 31, an area setting unit 32 and an object recognition unit 33. The information acquisition unit 31 acquires an image captured by the in-vehicle camera 21 and detection information of an object detected by the ultrasonic sensor 22. The area setting unit 32 inputs the detection information of the object provided by the ultrasonic sensor 22 from the information acquisition unit 31, and based on the input detection information, sets a partial area of the captured image captured by the in-vehicle camera 21 as the area on which image processing is to be performed (hereinafter referred to as "image processing area"). For example, a partial area of the captured image is set as the image processing area based on the distance information acquired from the reflected wave of the ultrasonic sensor 22. The object recognition unit 33 performs image processing on the image processing area of the captured image set by the area setting unit 32.

Based on the information on the object acquired by such image processing, the monitoring ECU 30 displays on the display device 36 an object existing near the host vehicle 50 or, when it is determined that the vehicle 50 may contact with the object, activates the alarm device 37 to issue a warning. In this case, since the object recognition processing performs image processing on a partial area of the captured image, the processing load of the image processing can be reduced as compared with the case where image processing is performed on the entire area of the captured image. The aim is to thus promptly provide information on the current surrounding environment of the host vehicle 50 to the driver.

Here, if the image processing area is too large as compared with the size of the object in the image, it takes too much time for the image processing, and the time lag between the present surrounding environment of the host vehicle 50 and the information provided to the driver may increase. On the other hand, if the size of the image processing area is too small as compared with the size of the object in the image, there is a concern that the object is not sufficiently included in the set image processing area, and the recognition accuracy of the object may deteriorate.

Therefore, in the present embodiment, the area setting unit 32 uses the distance information, the directional information, and the object width information of the object as the object detection information provided by the ultrasonic sensor 22, and sets the image processing area based on the distance information, the directional information, and the object width information. The aim is to set an image processing area with a position and size corresponding to the position and the object width of the object in the captured image. Note that the monitoring ECU 30 functions as the information acquiring unit 31, the area setting unit 32, and the object recognition unit 33.

Figure 3:
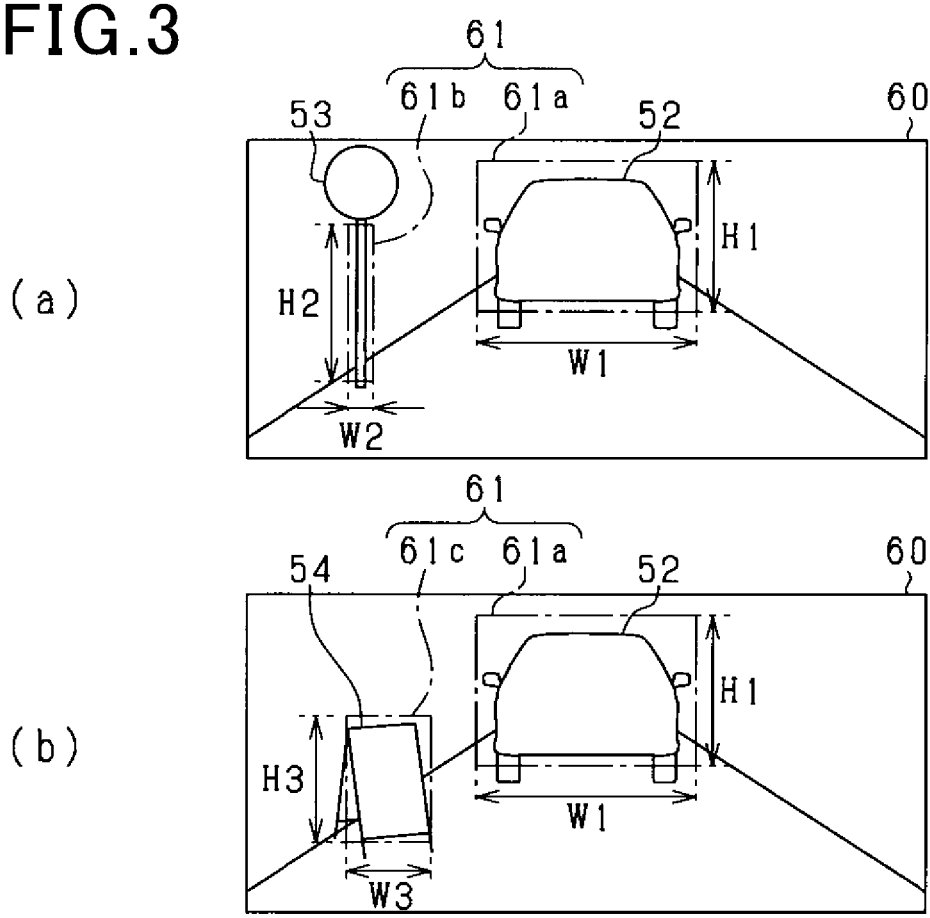
FIG. 3 is a diagram showing a specific mode of the process of setting the image processing area.

FIG. 3 is a diagram showing a specific example of the image processing area 61 (61a to 61c) set in the captured image 60. FIG. 3(a) shows a case where another vehicle 52 and a sign 53 exist in from of the host vehicle 50, and FIG. 3(b) shows a case where another vehicle 52 and a standing sign board 54 (for example, a construction signboard, a parking lot signboard, etc.) exist in front of the host vehicle 50. In FIG. 3, it is assumed that these objects 52 to 54 are detected by the ultrasonic sensor 22.

The monitoring ECU 30 sets the image processing area 61 in the captured image 60 based on the distance information, the directional information, and the object width information of the object acquired by the ultrasonic sensor 22. In the present embodiment, a reference position (for example, the center point) of the image processing area 61 is set from the distance information and the directional information of the object acquired by the ultrasonic sensor 22, and the image processing area 61 having a size corresponding to the object width information and the distance information is set over an area including the set reference point. In the present embodiment, the object width information is acquired based on information on the reflection surface of the object (hereinafter referred to as "reflection surface information") of when the probing wave transmitted from the ultrasonic sensor is reflected and received as a reflected wave. The reflective surface information will be described later.

In the present embodiment, the image processing area 61 is set as a rectangular area having a lateral width parallel to the vehicle width direction (lateral direction) of the host vehicle 50 and a vertical height perpendicular to the vehicle width direction. In the case of FIG. 3, the image processing area 61a having the lateral width of W1 and the vertical height of H1 is set for the other vehicle 52, and for the sign 53, the image processing area 61b having the lateral width of W2 and the vertical height of H2 is set. For the standing signboard 54, the image processing area 61c having the lateral width of W3 and the vertical height of H3 is set.

In the captured image 60 of FIG. 3, the lateral widths W1 to W3 are set according to the object width and the detection distance of each object acquired by the ultrasonic sensor 22. Specifically, the larger the object width, the larger the lateral width. Further, the shorter the detection distance, the larger the lateral width. The vertical heights H1 to H3 may be predetermined values or may be determined according to the detection distance. Further, they may be values corresponding to the height of the object recognized by the edges of the captured image. In the case of setting the vertical height based on the detection distance, it is preferable to set the vertical height such that the shorter the detection distance, the larger the vertical height.

Next, the reflection surface information of the object will be described. In order to acquire the reflection surface information of the object by using the distance measurement result of the ultrasonic sensor 22, a surface model for detecting surface components from a plurality of reflection points on the object surface is used on the premise that the direct reflection points and the indirect reflection points exist on the same plane.

Figure 4:
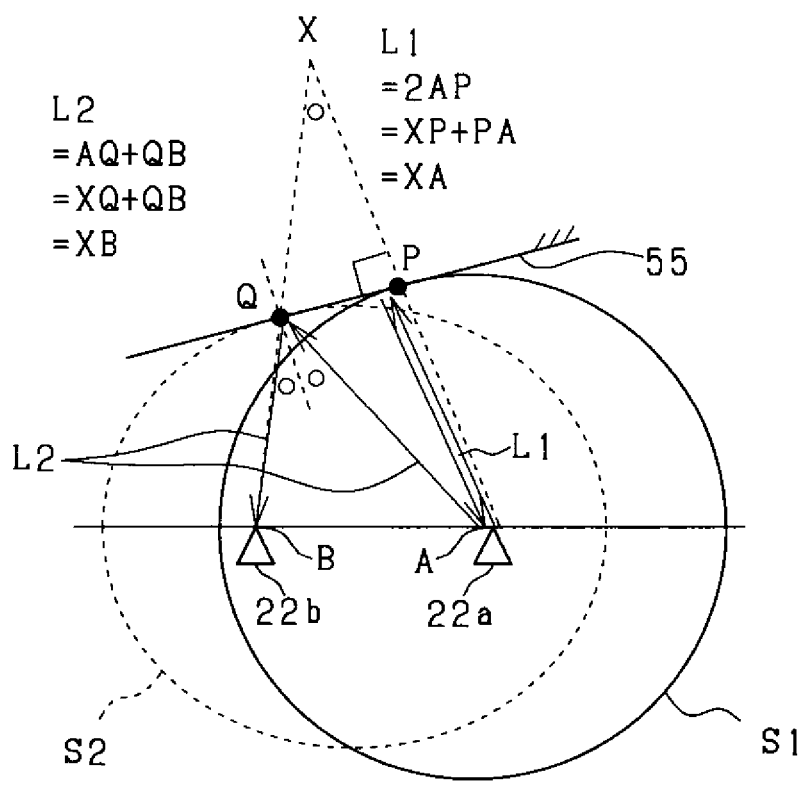
FIG. 4 is a diagram for explaining the way of acquiring the reflection surface information of an object.

FIG. 4 is a diagram for explaining a calculation model for acquiring reflection point information. In FIG. 4, the object 55 existing in front of the vehicle is being detected by the first sensor 22a and the second sensor 22b, and the direct reflection point P and the indirect reflection point Q exist on the outer surface of the object 55.

The direct wave received by the first sensor 22a is reflected so as to trace the shortest distance with respect to the object 55, that is, perpendicular to the object 55. X in FIG. 4 represents the intersection of a straight line that passes through the first sensor 22a receiving the reflected wave as a direct wave and the direct reflection point P, and a straight line that passes through the second sensor 22b receiving the reflected wave as the indirect wave and the indirect reflection point Q. The midpoint between the first sensor 22a and the intersection point X will be the reflection point P, and the intersection point of the line passing through the direct reflection point P and perpendicular to AX with BX will be the indirect reflection point Q. The reflection points P and Q are two points arranged side by side on the outer surface of the object 55. By obtaining the coordinates of these two reflection points P and Q, it is possible to obtain PQ which is a reflection surface line segment.

In order to obtain the reflection surface segment PQ based on the result of the distance measurement from the direct wave and the result of the distance measurement from the indirect wave, first, the monitoring ECU 30 finds the intersection point X based on the measured distance L1 from the direct wave and the measured distance L2 from the indirect wave (intersection calculating unit), and then calculates the direct reflection point P based on the intersection point X (reflection point calculating unit). Further, the reflection surface segment PQ passing through the direct reflection point P and extending in a direction that intersects orthogonally with the straight line connecting the direct reflection point P and the first sensor 22a is obtained as the reflection surface information (information acquisition unit).

The monitoring ECU 30 further obtains a plurality of reflection surface line segments at positions different in the vehicle width direction by changing the combination of the ultrasonic sensors 22. Then, when it is determined that neighboring plurality of reflection surface line segments belong to the same object based on the end point coordinates and the inclinations of the reflection surface line segments, the plurality of reflection surface line segments are combined. As a result, information on the object 55 existing near the host vehicle 50, that is, its size in the vehicle width direction of the host vehicle 50 (object width information), and its inclination with respect to the vehicle with direction (orientation information) can be obtained on the basis of the reflection surface information.

The surface model described above is particularly effective when the object has a relatively large plane and the plane serves as the reflection surface. In the case the object width cannot be estimated by the surface model, for example, the object width is estimated based on the edges extracted from the captured image, and an image processing area of a size corresponding to the estimated object width is set.

Next, the specific procedures of the image processing of this embodiment will be described with reference to the flowchart of FIG. 5. This process is executed by the monitoring ECU 30 at predetermined intervals.

Figure 5:
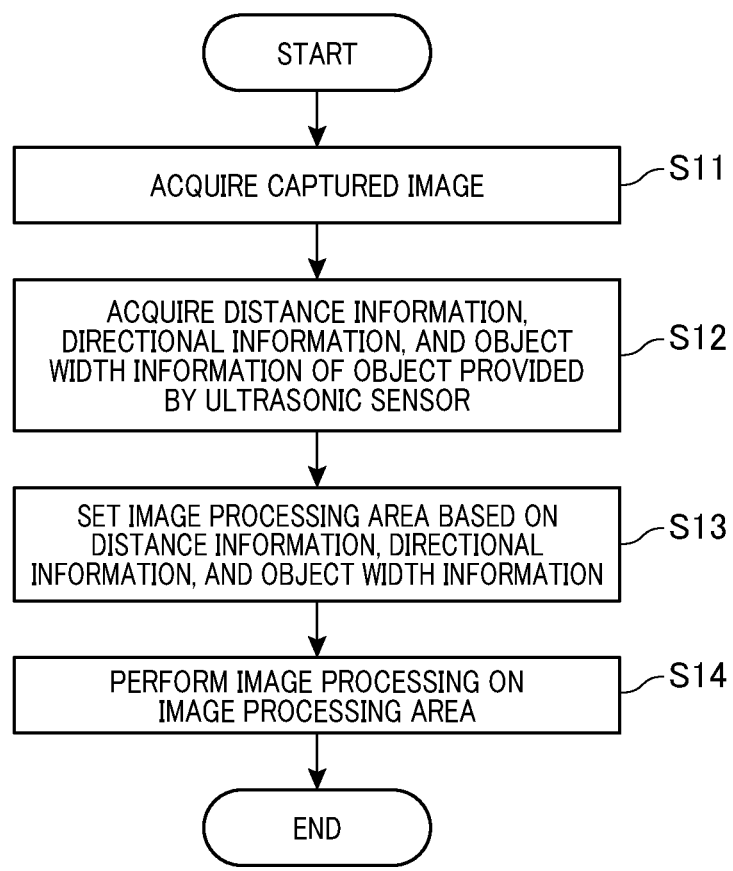
FIG. 5 is a flowchart showing the procedures of the image processing.

In FIG. 5, in step S11, a captured image photographed by the in-vehicle camera 21 is acquired. In the following step S12, the distance information, directional information, and object width information of the object are acquired (information acquisition unit) as the object detection information provided by the ultrasonic sensor 22. At this time, the object width information is acquired from the reflection surface information, and when the reflection surface information cannot be obtained, the object width is detected using the image edges.

In the following step S13, the image processing area 61 is set in the captured image based on the distance information, the directional information, and the object width information of the object acquired in step S12. At this time, the larger the object width or the shorter the detection distance, the larger the set width of the image processing area 61 in the lateral direction.

In the following step S14, image processing is executed on the image processing area set in step S13, and object recognition is performed (object recognition unit). In this image processing, detailed information on the object, such as the type of the object (for example, a vehicle, a pedestrian, a two-wheeled vehicle, etc.) and the height of the object are acquired. For example, the type of the object is determined by performing pattern matching on the feature points extracted from the part of the image of the image processing area. The height of the object is determined by converting the part of the image of the image processing area into a bird's-eye image, and determining the height of the object from the converted bird's-eye image. Upon completion of the processing of step S14, this routine is terminated.

Note that the image processing area 61 set in step S13 may be tracked in accordance with the movement of the host vehicle 50. Alternatively, the image processing area 61 may be updated every time based on the object detection information newly obtained by the ultrasonic sensor 22.

According to the present embodiment described above, the following advantageous effects can be obtained.

When setting the image processing area 61 in the image captured by the in vehicle camera 21 based on the detection information of the object 55 provided by the ultrasonic sensor 22, the image processing area 61 is set by using detection information on the object 55 including not only the distance information but also the directional information and the object width information of the object 55. With such a configuration, it is possible to set an image processing area having a size corresponding to the object width in the area corresponding to the position of the object 55. Thus, when object recognition is performed by image processing, it is possible to sufficiently perform image processing on the part corresponding to the object and reduce unnecessary image processing on the parts where no object exists (for example, the background), and therefore the processing load can be reduced. Therefore, according to the above configuration, it is possible to recognize the object 55 existing near the host vehicle 50 with high accuracy and as soon as possible.

The object width information is acquired based on the reflection surface information of the object 55 detected by the ultrasonic sensor 22, and the image processing area 61 is set using the acquired object width information. Specifically, the monitoring ECU 30 calculates the intersection X of a straight line that passes through the first sensor 22a and the direct reflection point P, and a straight line that passes through the second sensor 22b and the indirect reflection point Q to calculate the direct reflection point P based on the intersection X, and further, acquires an intersecting straight line passing through the direct reflection point P and extending in a direction intersecting with a straight line connecting the direct reflection point P and the first sensor 22a at a certain angle as the reflection surface information of the object 55. By using the reflection surface information of the object 55 acquired by the ultrasonic sensor it is possible to accurately obtain an object width corresponding to the orientation and size of the object 55.

The directional information and the object width information of the object are acquired with the plurality of ultrasonic sensors 22 using the direct wave and the indirect wave. In this case, by using the principle of triangulation, it is possible to accurately grasp the directional information and the reflection surface information of the object. Further, according to the reflection surface information of the object, based on the detection result of the ultrasonic sensor 22, it is possible to determine the orientation and size of the plane component of the object surface.

The ultrasonic sensor 22 tends to respond also to objects for which an alert does not need to be issued such as grass, shrubs, pebbles, and buffer stops, and even if the driving situation is actually safe, an alert may be issued to the driver. In addition, the detection area of the ultrasonic sensor 22 is relatively close to the vehicle, and when an object is detected by the ultrasonic sensor 22, the object recognition and the alerting to the driver should be executed quickly. In this respect, in a system having the ultrasonic sensor 7 as the distance measuring sensor, the image processing area 61 is set based on the distance information, the directional information, and the object width information of the object. Therefore, detailed information on an object existing around the vehicle can be accurately recognized using an image with a reduced processing load. In addition, since the information on the object can be quickly and accurately recognized, based on this information, it is possible to alert the driver at an appropriate timing of an object for which an alert should be issued, while preventing issuing unnecessary alerts for objects with which the vehicle is unlikely to contact.

Other Embodiments

The present disclosure is not limited to the above embodiments, and it may be implemented as follows, for example.

Figure 6:
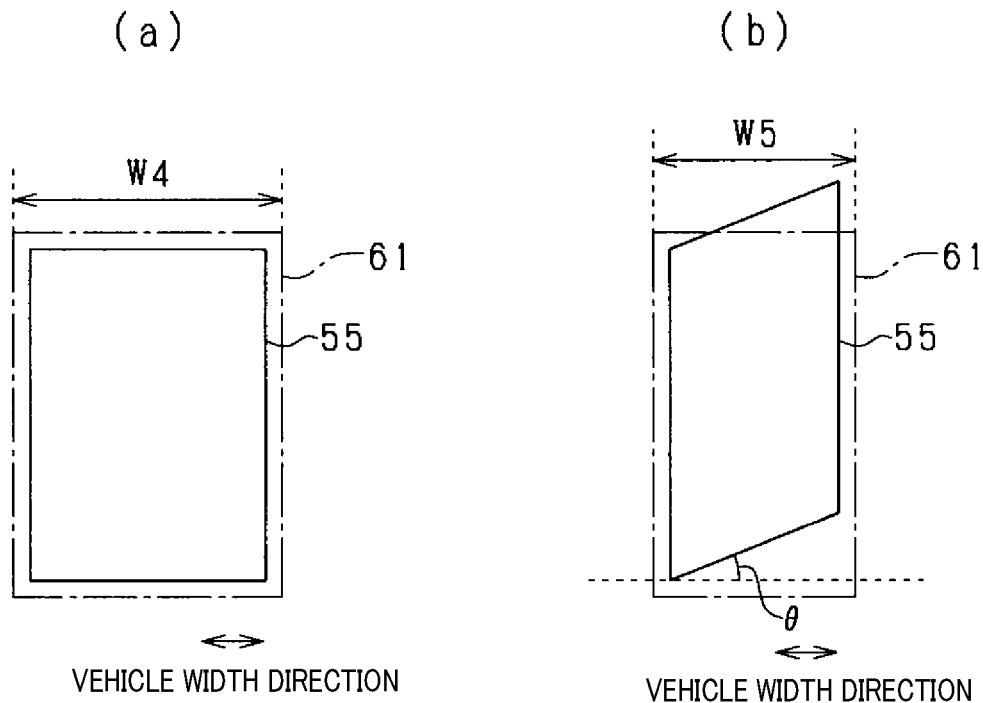
FIG. 6 is a diagram showing a specific mode of the process of setting the image processing area using the orientation information of an object.

In the above embodiment, the image processing area 61 may be set using the orientation information of the object obtained based on the reflection surface information of the object. When setting the image processing area 61, by taking into consideration the orientation of the object with respect to the vehicle width direction of the host vehicle 50, it is possible to sufficiently contain the object in the area, and at the same time, finely adjust the size of the image processing area 61 as small as possible. Specifically, for an object 55 inclined at an angle θ with respect to the vehicle width direction of the host vehicle 50 (see FIG. 6(b)), the lateral width of the image processing area 61 will be set smaller (W5<W4) than in the case of an object 55 that is face to face with the host vehicle 50 (FIG. 6(a)). At this time, the larger the angle θ, that is, the larger the inclination with respect to the vehicle width direction, the smaller the set lateral width. Further, the vertical height may be variably set according to the certain angle θ. Specifically, for example, the larger the angle θ, the larger the set vertical height.

Figure 7:
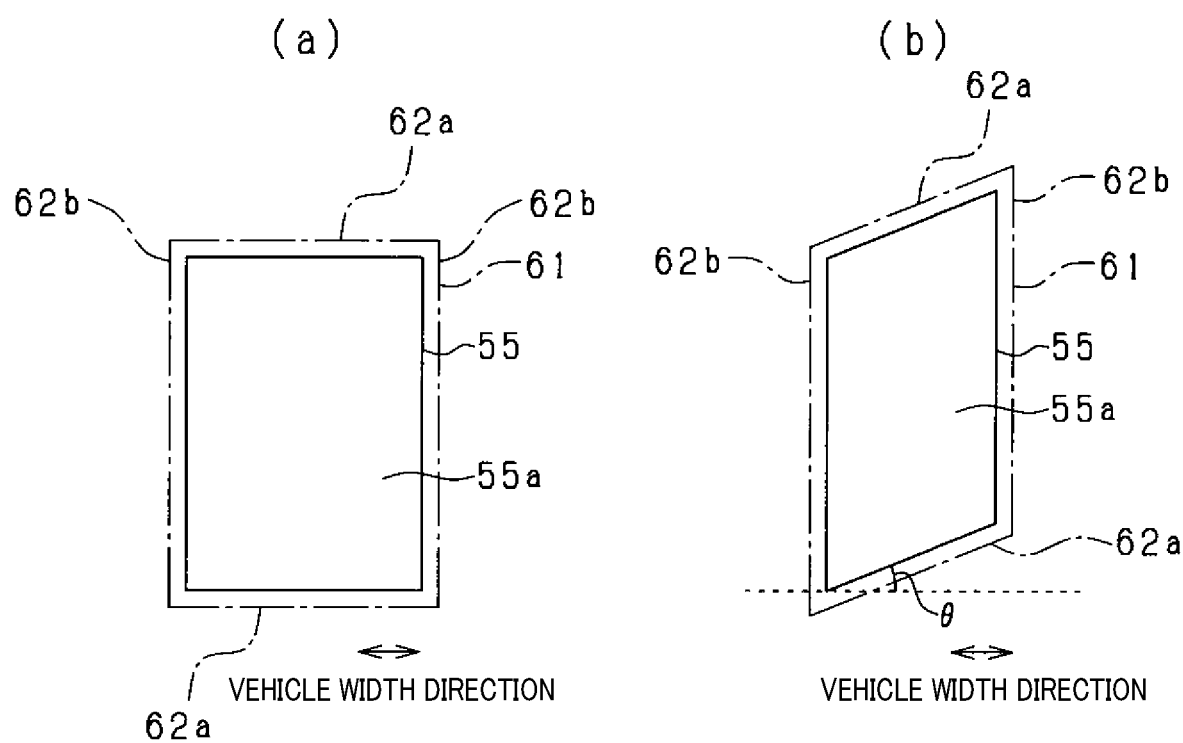
FIG. 7 is a diagram showing a specific mode of the process of setting the image processing area using the orientation information of an object.

The configuration for setting the image processing area 61 using the orientation information of the object may be such that, as shown in FIG. 7, the direction in which the lateral width of the image processing area 61 extends is determined according to the orientation of the object acquired based on the reflection surface information. With such a configuration, it is possible to set the image processing area 61 having an appropriate position and size according to the orientation of the object 55. Specifically, when the reflection surface 55a of the object 55 is directly facing the host vehicle 50, as shown in FIG. 7(a), an area where the left and right boundary lines 62a and the upper and lower boundary lines 62b intersect at right angles is set as the image processing area 61. On the other hand, when the reflection surface 55a of the object 55 is not directly facing the host vehicle 50 and is inclined with respect to the vehicle width direction of the host vehicle 50, as shown in FIG. 7(b), an area surrounded by the left and right boundary lines 62a inclined at a certain angle θ and the upper and lower boundary lines 62b is set as the image processing area 61.

In the above embodiment, a plurality of ultrasonic sensors 22 are used to obtain the distance information from the direct wave and the distance information from the indirect wave, and based on the principle of triangulation, the orientation information and the object width information of the object are acquired. Alternatively, it is also possible to use a single ultrasonic sensor 22, and acquire the orientation information and the object width information of the object based on a history of reflection points obtained while the vehicle 50 is moving. In other words, the orientation information and the object width information of the object may be acquired based on the principle of moving triangulation using the distance information provided by a single ultrasonic sensor 22 and vehicle information example, vehicle speed, steering angle, etc.).

In the above-described embodiment, the object width information is acquired based on the reflection surface information of the object acquired by the ultrasonic sensor 22, but the way of acquiring the object width information by the ultrasonic sensor is not limited thereto. For example, the object width information of the object 55 may be acquired based on a point sequence detected by the ultrasonic sensor 22.

In the above embodiment, the image processing area 61 is set in the captured image captured by the in-vehicle camera 21. However, it is also possible to apply the configuration of the present disclosure in the case the image processing area is set in the bird's-eye image obtained by converting the captured image into the bird's eye viewpoint.

Whether or not an object detected by the ultrasonic sensor 22 is likely to contact with the host vehicle 50 is determined based on information on the driving state of the host vehicle 50. Then, when the object is determined to be unlikely to contact with the host vehicle 50, the image processing area 61 may not be set in the image captured by the in-vehicle camera 21, and when it is determined that they may contact, the image processing area 61 may be set for such object. With such a configuration, it is possible to alleviate the processing load of image processing as much as possible, and at the same time properly alert the driver of an object that may contact with the vehicle 50. The information on the driving state of the host vehicle 50 includes, for example, the vehicle speed, the steering angle, and the like. In this case, the monitoring ECU 30 serves as a contact judging unit. For example, in FIG. 3, when the driver of the host vehicle 50 is steering to the right, among the objects detected by the ultrasonic sensor 22, the image processing area 61 is not set for the sign 53 and the standing signboard 54, but the image processing area 61 is set for another vehicle 52.

The image processing area 61 may be set only for an area in the image captured by the in-vehicle camera 21 that is recognized that there may be contact between the host vehicle 50 and the object based on the information on the driving state of the vehicle 50.

In the case the detection information of a plurality of objects is acquired by the ultrasonic sensor 22 and the objects are within a predetermined proximity range in the image, a single image processing area may be set that includes the objects within the proximity range. Depending on the ultrasonic sensor 22, even when a plurality of separate objects are recognized, they may overlap with one another in the image and appear as one object. By adopting the above configuration in consideration of such a case, it is possible to collectively perform image processing on the overlapping image targets and thus reduce the processing load.

If there is an object whose reflectance varies greatly with time among the object detection information acquired by the ultrasonic sensor 22, the image processing area that has been once set for the object may be held for a predetermined time. By adopting such a configuration, it is possible to prevent omission of detection of the object by adding the image processing area even when hunting occurs in the result of object detection.

In the above embodiment, the in-vehicle camera 21 is attached to a front part of the vehicle 50. However, the position and number of the in-vehicle camera 21 are not particularly limited, and the present technique may be applied to an in-vehicle camera 21 attached to a rear or lateral part of the host vehicle 50.

In the above embodiment, a distance measuring sensor is provided as the ultrasonic sensor 22. However, the present technique may also be applied to a configuration comprising a millimeter wave radar, a laser radar, or the like.

The above-described constituent elements are conceptual and are not limited to those of the above embodiments. For example, the function of one constituent element may be distributed to a plurality of constituent elements, or the functions of a plurality of constituent elements may be integrated into one constituent element.

Although the present disclosure is described based on examples, it should be understood that the present disclosure is not limited to the examples and structures. The present disclosure encompasses various modifications and variations within the scope of equivalence. In addition, the scope of the present disclosure and the spirit include other combinations and embodiments, only one component thereof, and other combinations and embodiments that are more than that or less than that.

The invention claimed is:

1. A perimeter monitoring device applied to a vehicle including an imaging device for capturing an image of a surroundings of the vehicle and a plurality of distance measuring sensors, in which, the plurality of distance measuring sensors include a first sensor that transmits probing waves and receives reflected waves as direct waves and a second sensor different from the first sensor that transmits probing waves and receives reflected waves as indirect waves, the perimeter monitoring device comprising:
   an information acquisition unit for acquiring distance information, directional information, and object width information of an object existing in a vicinity of the vehicle as detection information of the object provided by the plurality of distance measuring sensors;
   an area setting unit for setting an image processing area on which image processing is performed in the image captured by the imaging device based on the distance information, the directional information, and the object width information acquired by the information acquisition unit;
   an object recognition unit for performing the image processing on the image processing area set by the area setting unit to recognize the object;
   an intersection calculating unit for calculating an intersection point of a straight line passing through the first sensor and a direct reflection point that is a reflection point of the direct wave, and a straight line passing through the second sensor and an indirect reflection point that is a reflection point of the indirect wave; and
   a reflection point calculating unit for calculating the direct reflection point based on the intersection point, wherein
   the information acquisition unit acquires an intersecting straight line that passes through the direct reflection point and extends in a direction intersecting with a straight line connecting the direct reflection point and the first sensor at a certain angle as reflection surface information of the object, and acquires the object width information and an orientation information of the object based on the reflection surface information of the object detected by the plurality of distance measuring sensors, and
   the area setting unit sets the image processing area using the object width information and the orientation information of the object acquired based on the reflection surface information in response to the orientation information of the object acquired based on the reflection surface information being an orientation inclined at a certain angle with respect to a vehicle width direction, an area surrounded by left and right boundary lines and upper and lower boundary lines inclined at the certain angle with respect to the vehicle width direction is set as the image processing area.

2. The perimeter monitoring device according to claim 1, wherein
   the information acquisition unit acquires orientation information of the object based on the reflection surface information, and
   the area setting unit sets the image processing area using the orientation information acquired based on the reflection surface information.

3. The perimeter monitoring device according to claim 1 further comprising:
   a contact judging unit for judging whether or not the vehicle is likely to contact with the object detected by the plurality of distance measuring sensors based on information on a driving state of the vehicle, wherein
   the area setting unit does not set the image processing area in the image captured by the imaging device for an object judged to be unlikely to contact with the vehicle by the contact judging unit.

4. The perimeter monitoring device according to claim 1, wherein
   the plurality of distance measuring sensors comprise an ultrasonic sensor.

5. A perimeter monitoring method applied to a vehicle including an imaging device for capturing an image of a surroundings of the vehicle and a plurality of distance measuring sensors, in which, the plurality of distance measuring sensors include a first sensor that transmits probing waves and receives reflected waves as direct waves and a second sensor different from the first sensor that transmits probing waves and receives reflected waves as indirect waves, the perimeter monitoring method comprising:
   acquiring distance information, directional information, and object width information of an object existing in a vicinity of the vehicle as detection information of the object provided by the plurality of distance measuring sensors;
   setting an image processing area on which image processing is performed in the image captured by the imaging device based on the acquired distance information, directional information, and object width information;
   performing the image processing on the set image processing area to recognize the object;
   calculating an intersection point of a straight line passing through the first sensor and a direct reflection point that is a reflection point of the direct wave, and a straight line passing through the second sensor and an indirect reflection point that is a reflection point of the indirect wave; and
   calculating the direct reflection point based on the intersection point, wherein
   an intersecting straight line is acquired, in which the intersecting straight line passes through the direct reflection point and extends in a direction intersecting with a straight line connecting the direct reflection point and the first sensor at a certain angle as reflection surface information of the object,
   the object width information and an orientation information of the object is acquired based on the reflection surface information of the object detected by the plurality of distance measuring sensors, and
   the image processing area is set using the object width information and the orientation information of the object acquired based on the reflection surface information in response to the orientation information of the object acquired based on the reflection surface information being at an orientation inclined at a certain angle with respect to a vehicle width direction, an area surrounded by left and right boundary lines and upper and lower boundary lines inclined at the certain angle with respect to the vehicle width direction is set as the image processing area.

* * * * *